Figure 1:
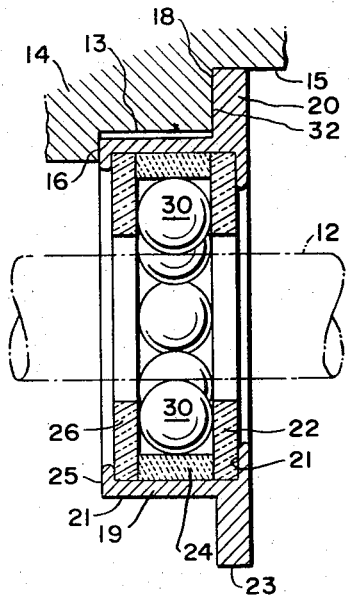

United States Patent

Fairbank

[15] 3,653,732
[45] Apr. 4, 1972

[54] MULTI-BALL PIVOT ASSEMBLY

[72] Inventor: Winthrop H. Fairbank, Sudbury, Mass.
[73] Assignee: Northop Corporation, Palos Verdes, Calif.
[22] Filed: Aug. 21, 1969
[21] Appl. No.: 851,958

[52] U.S. Cl.............................................308/193, 308/174
[51] Int. Cl. ....................................F16c 33/00, F16c 19/04
[58] Field of Search ..........................308/230, 234, 189, 207

[56] References Cited

UNITED STATES PATENTS

| | | | |
|---|---|---|---|
| 2,149,492 | 3/1939 | Annen | 308/230 |
| 1,067,860 | 7/1913 | Bradshaw | 308/159 |
| 2,334,002 | 10/1943 | Heintz et al. | 308/230 |
| 2,731,309 | 1/1956 | Hart | 308/233 |
| 2,969,265 | 1/1961 | Jones | 308/230 |

Primary Examiner—Martin P. Schwadron
Assistant Examiner—Frank Susko
Attorney—Kenway, Jenney & Hildreth

[57] ABSTRACT

A multi-ball pivot assembly for use in precision bearing applications such as gyroscope suspension systems. No inner raceways are utilized, the balls being directly in contact with the surface of the rotatable shaft. No conventional outer raceways, as such, are used either, a right cylinder of hard material being positioned to serve as the outer ring against which the balls bear. A pair of flat washers of sapphire or other similarly hard material serve to retain the balls in position axially of the shaft. The entire pivot assembly is preferably enclosed by a flanged holder designed to be firmly and accurately retained in the body of the unit in which the shaft turns.

2 Claims, 2 Drawing Figures

PATENTED APR 4 1972

3,653,732

INVENTOR
WINTHROP H. FAIRBANK

BY
Kenway, Jenney &
Hildreth

ATTORNEYS

MULTI-BALL PIVOT ASSEMBLY

The use of ball bearings to reduce friction between parts which move relative to each other is an ancient practice. Where the motion is rotary, it has become a standard practice to utilize inner and outer races and, frequently, a ball separator or a retainer to hold the balls in assembled relation and to aid in keeping them in position in the races. One or both of the races are usually contoured so that their radii approximately match those of the balls.

For many applications, pivots incorporating such ball bearing assemblies are eminently suitable. However, in precision applications such as those encountered in instrumentation and in elements of guidance systems, the demands for accuracy approach the impossible and pivots having conventional ball bearing assemblies are simply not good enough.

The most critical element of most guidance systems is a gyroscopic device in which the suspension of the gimbal poses unique problems. Specifically, there is little concern for control of running friction because relative rotary movement between the gimbal and its holder is quite limited. On the other hand, starting friction and random torque effects are of importance because they give rise to errors which are of great significance in guidance environments.

These errors may stem from various factors. First, the inner and outer races of conventional assemblies are often slightly misaligned causing the balls to bind. Also, the plane of ball contact and the bearing thrust plane may be misaligned causing end-loading and undesirably high thrust loading. Also, various imperfections in the raceway that may be in the finish, concentricity, or roundness give rise to problems. Friction may be exerted on the balls by the separator or retainer and the retainer may transmit random ball torques from unloaded balls to loaded balls. Finally, there may be cross-coupling of ball rotations which gives rise to race torques.

In addition to the friction-related problems enumerated, it is essential in gyroscope suspension applications to define and to maintain a precisely repeatable center of pivot for the gimbal. That is, bearing anomalies cannot be permitted to cause changes in center of pivot relative to center of gravity. In conventional systems, these changes may result from any one or a combination of errors between gimbal and inner race, in the curvature of either race, or even because of separator binding and the like. Multiplicity of parts gives rise to multiple possibilities of error. The present invention is primarily concerned with the elimination of the difficulties outlined which give rise to errors that are intolerable in guidance systems.

Thus, one object of the present invention is the improvement of pivot assemblies to the point where they may advantageously be used in precision application.

It is another object of the present invention to increase the accuracy of instrumentation especially in guidance systems.

It is a further object of the present invention to provide a gyroscope suspension system of the utmost precision.

Generally, the objects of the present invention are attained by totally eliminating the inner race from bearings used in a multi-ball pivot assembly. The inner element being supported in the bearings, typically a gimbal or other shaft, is made of a suitable metal which can tolerate direct contact with the balls. Outer races are also eliminated and a simple right cylindrical ring having an interior surface finished to instrument surface quality is substituted. No conventional ball retainer is used, the balls substantially filling the annular volume between the shaft and the unit in which the shaft turns. The balls are retained in directions axial of the shaft by washers designed to limit their freedom to move axially. The entire assembly may be contained in a holder suitably spun and flanged to contain and mount the elements of the assembly.

Figure 2:
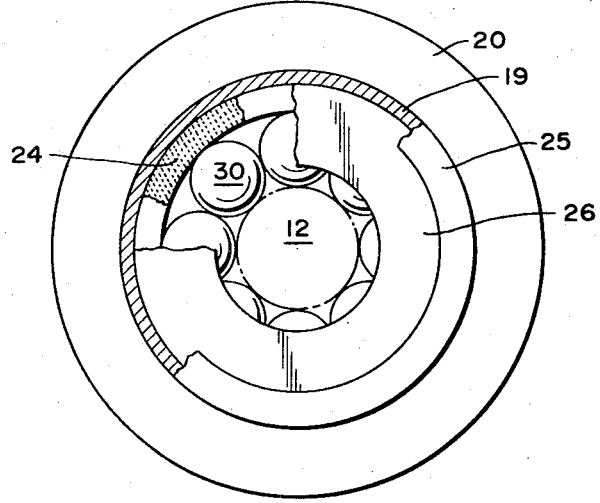

A preferred embodiment of the present invention is described in the following specification which should be read with reference to the attached drawing in which:

FIG. 1 is a showing, partly in section, of a suspension system made in accordance with the present invention, and FIG. 2 is a cross-section of the suspension system of FIG. 1.

Referring now to the drawing, there may be seen a shaft or gimbal 12 arranged to pivot relative to a housing 14. Although, as noted above, the invention finds its most valuable applications in gyroscope suspension systems, the type of device under consideration is immaterial and either the element 12 or the element 14 or both may rotate. The housing 14 is shown as having concentric openings 13 and 15 which bottom at shoulders 16 and 18 respectively. A flanged holder or retainer 20 is fitted into the housing 14 in such a manner that its lower end 19 is adjacent the shoulder 16 and the under surface of the retainer flange bottoms on the shoulder 18. Actually, for accuracy in assembly and to accommodate the lower end of the retainer which is spun or turned as explained below, a small gap is deliberately left between the shoulder 16 and the lower end surface 19 of the retainer 20. Slight clearance is also left between the inside diametrical surfaces of the concentric holes 13 and 15 formed in the housing 14 and adjacent peripheral surfaces 21 and 23 of the retainer 20. The shoulder 18 may then be properly prepared and machined to serve as the primary reference point or assembly mounting face as explained in greater detail hereinbelow.

An internal shoulder 21 is formed in the retainer 20 to accommodate and position, first, a washer 22 of sapphire or other hard material, then a ring 24 of hard material such as tungsten carbide and a second washer 26 which is also of hard material such as sapphire. In the annular volume defined by the shaft 12, the sapphire washers 22 and 26 and the ring 24 are disposed bearing balls 30 which may be made of sintered tungsten carbide or similarly hard material. The balls may be of whatever number required to substantially fill the volume radially and circularly. In most instances, eight such balls have proven suitable in structures of practical dimensions.

The flanged retainer 20 may be cemented or clipped in the housing 14 or may otherwise be fixed in place with the lower surface 32 of the flange and the shoulder 18 serving as the assembly plane of reference. These surfaces are preferably lapped to provide a high degree of accuracy in the placement of the retainer relative to the housing.

In order that the balls may run directly against the shaft 12, that member is preferably made of hard material such as Kennametal "Van Keran" wire. The balls themselves, as noted, are preferably of instrument grade tungsten carbide but, in some circumstances, standard commercial grade will suffice. The inner surface of the ring 24 also is preferably of instrument surface quality, although here, too, the need for such precision is not always present.

In the entire assembly, all contacts involving the balls are essentially point contacts. Moreover, both surfaces in radial contact with the balls are circular enabling the achievement of better surface finish, roundness and concentricity, thus substantially eliminating radial play. The sapphire washers are only involved to the extent that they limit the excursions of the balls in directions parallel to the gimbal axis. No separators or retainers of the type found in conventional caged bearings are needed or desired and the errors inherent in the use of such separators are thereby avoided.

In a system specifically designed for gyroscope suspension use, the assembly of sapphire washers, outer ring and balls is held in place by spinning or turning the edge 25 of the lower end 19 of the retainer inwardly over the sapphire washer 26. Because the retainer is made of brass or other relatively soft metal, it is thus possible to tightly engage the washers and ring in the retainer, the ring being of sufficient height to prevent pressure from being exerted on the balls.

In a typical suspension system, the balls are of 0.026593 inch diameter, the inner diameter of the ring 24 is 0.096246 inch and its length is 0.027093 inch. The gimbal or shaft 12 has an outside diameter of 0.043000 inch and the inside diameter of the washers 22 and 26 is 0.054 inch. The critical dimensions of the housing 14 and the retainer 20 concern only the interfaces 13 – 21 and 18 – 32 whereby assembly is achieved. The diameter of the cylinder 31 must not be great enough to give an interference fit which would cause distortion of the ring 24. The interface 18 – 32, as noted, is one preferably of lapped surfaces and the plane of the interface must be perpendicular to the axis of the shaft 12.

Certain tolerances on roundness, concentricity and perpendicularity are also critical for precision applications. These include: Balls <2µin., Ring I.D. (24) round to <10µin., Ring finish <2µin., Shaft (12) round to <5µin., Short finish <2µ in., Surface finish of washers <2µin.

The dimensions listed above are chosen to allow a nominal radial clearance of 15µin. between adjacent components. Preferably, the tolerances on diameters, roundness and finish are controlled so that total radial shake does not cause excessive looseness under the worst case conditions. Conversely, the control is such that interference, (zero radial play), is also avoided. In the typical case, variations in dimensions of individual components result in a total variation of radial clearance between adjacent elements of approximately ±7µin. The foregoing are, of course, only exemplary figures. the 15 in. nominal radial clearance may be reduced to as little as approximately 7µin. and the total variation of radial clearance of ±7µin. may be reduced to ±3µin. That is, a total radial play of approximately 28µin. without interferences and with minimum tolerances is attainable. The foregoing description is based upon the consideration that gaps across the bearing occur between a point on the inner wall of the ring 24 and the surface of a given adjacent ball, between the opposite surface of that ball and the shaft, between the shaft and the surface of a ball diametrically opposite the given ball and between the opposite ball and an opposite point on the inner surface of the ring 24.

Insofar as axial play of the balls between the washers 22 and 26 is concerned, it is held to a nominal 0.0005 in. allowing a full 0.001 in. axial play of the shaft without scuffing. In some situations, where end play of the shaft must be minimal the ball-washer clearance should be reduced to a minimum without interference to avoid staggering of the balls which could cause errors resulting from increased friction from axial force vectors.

The importance of accurate definition of the pivot center has previously been noted. With the assembly of the present invention, pivot center error is but a fraction of that which might be expected considering the total radial play. This is so because the balls, in a sense, form a cradle for the shaft. Actually, the assembly has a present uncertainty improvement of 7 over the best commercial bearings. Stated otherwise, the pivot center migrates only about 12µin. compared to an 80µin. migration that would be encountered with commercial bearings. This has proven to be so even where radial play is as great as 60µin.

The load-carrying capability of the assembly of the invention where tungsten carbide is used is approximately equal to that of a five-ball stainless steel curved race bearing.

The invention should be limited not to the details of the preferred embodiment shown but only by the spirit and scope of the appended claims.

What is claimed is:

1. A precision pivot assembly for incorporation in a housing comprising a shaft of circular cross-section composed of relatively hard material and arranged for limited rotation relative to said housing, at least two concentric openings being formed in said housing to provide a reference shoulder, a flanged ring retainer of relatively soft material fixed in said housing with a surface of said flange abutting said reference shoulder, a ring and a pair of washers of relatively hard material spaced apart by said ring fixed within said retainer and defining an annular volume of rectangular cross-section disposed concentrically within said housing and about said shaft, and a plurality of balls of relatively hard material substantially filling said volume and in point contact with each other, said ring and said washers.

2. A precision pivot assembly as defined in claim 1 wherein said ring and said balls are formed of tungsten carbide and said washers are formed of sapphire.

* * * * *